(12) United States Patent
Kadomatsu

(10) Patent No.: US 9,560,181 B2
(45) Date of Patent: Jan. 31, 2017

(54) COMMUNICATION APPARATUS AND CONTROL METHOD FOR THE SAME

(71) Applicant: CANON KABUSHIKI KAISHA, Tokyo (JP)

(72) Inventor: Daiki Kadomatsu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/977,370

(22) Filed: Dec. 21, 2015

(65) Prior Publication Data
US 2016/0191685 A1 Jun. 30, 2016

(30) Foreign Application Priority Data

Dec. 25, 2014 (JP) .................................. 2014-262502

(51) Int. Cl.
H04M 1/22 (2006.01)
H04M 3/08 (2006.01)
H04M 3/22 (2006.01)
H04M 1/24 (2006.01)
H04M 3/30 (2006.01)
H04M 3/14 (2006.01)

(52) U.S. Cl.
CPC ................ *H04M 1/24* (2013.01); *H04M 3/14* (2013.01); *H04M 3/305* (2013.01)

(58) Field of Classification Search
CPC ........ H04M 3/005; H04M 3/18; H04M 11/06; H04N 1/32708; H04N 1/3273
USPC ....... 379/1.01, 2, 22.06, 24, 26.01, 26.02,379/27.01, 27.05, 27.06, 27.07, 29.01, 32.01; 358/400, 406
See application file for complete search history.

(56) References Cited

U.S. PATENT DOCUMENTS

| | | | | |
|---|---|---|---|---|
| 6,529,598 B1* | 3/2003 | Sacca | ..................... | H04M 11/06 379/2 |
| 8,254,562 B2* | 8/2012 | Yang | ..................... | H04M 3/005 379/2 |
| 9,247,102 B2* | 1/2016 | Lee | ..................... | H04N 1/32708 |
| 2010/0278329 A1* | 11/2010 | Yang | ..................... | H04M 3/18 379/412 |
| 2014/0333973 A1* | 11/2014 | Lee | ..................... | H04N 1/3273 358/442 |

FOREIGN PATENT DOCUMENTS

JP 5146430 B2 2/2013

* cited by examiner

*Primary Examiner* — Binh Tieu
(74) *Attorney, Agent, or Firm* — Canon USA, Inc. IP Division

(57) ABSTRACT

A communication apparatus includes: a first determination unit configured to determine whether a first voltage identified under conditions where a telephone connection terminal is connected to a modem unit is greater than or equal to a first threshold value; a second determination unit configured to, if the first determination unit determines that the first voltage is greater than or equal to the first threshold value, determine whether a second voltage identified under conditions where the telephone connection terminal is disconnected from the modem unit tends to decrease; and a third determination unit configured to determine connection states of the telephone connection terminal and a line connection terminal based on determination results of the first determination unit and the second determination unit. If the second determination unit determines that the identified second voltage has decreased more than once, the third determination unit determines that a wrong connection has been made.

16 Claims, 7 Drawing Sheets

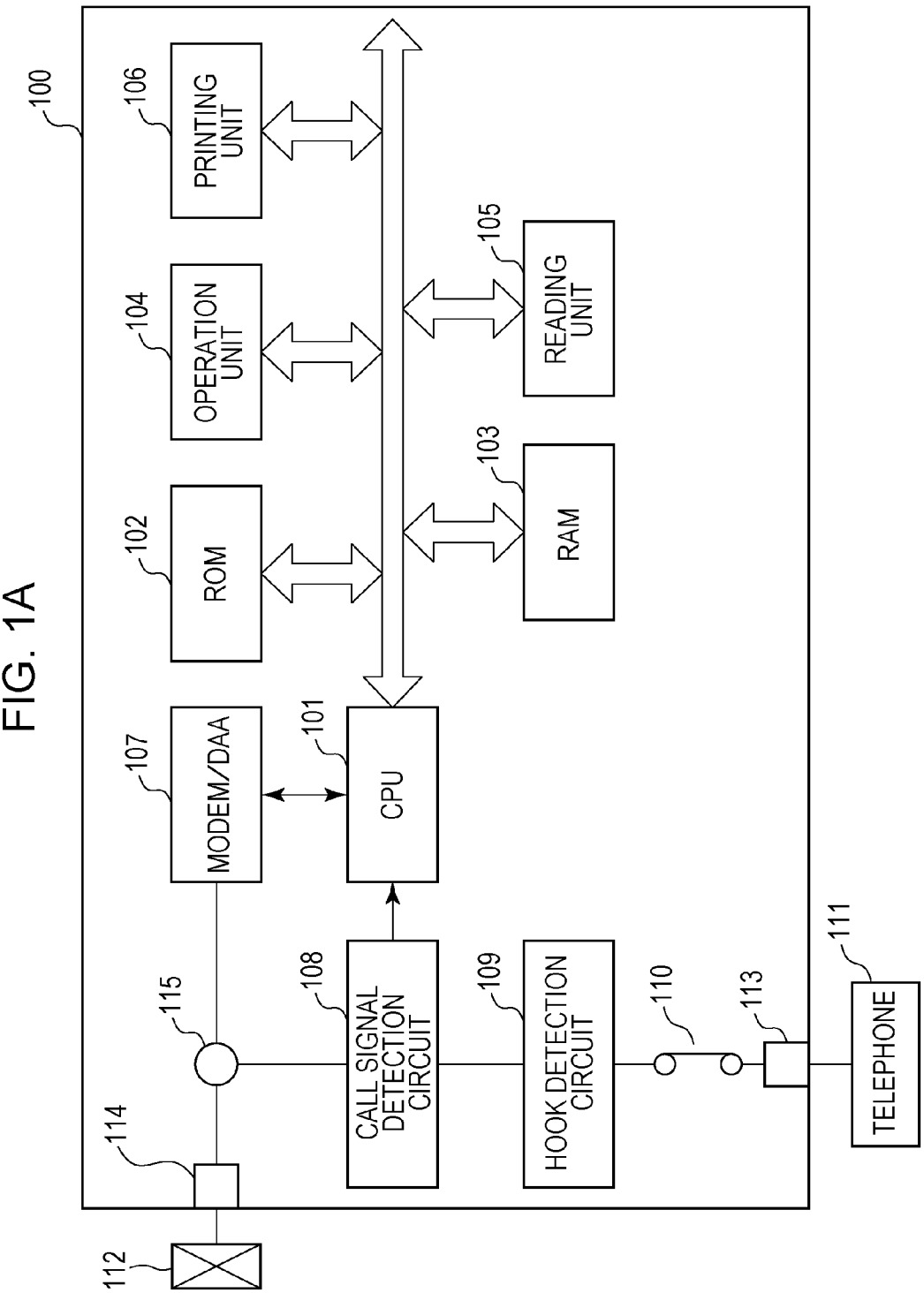

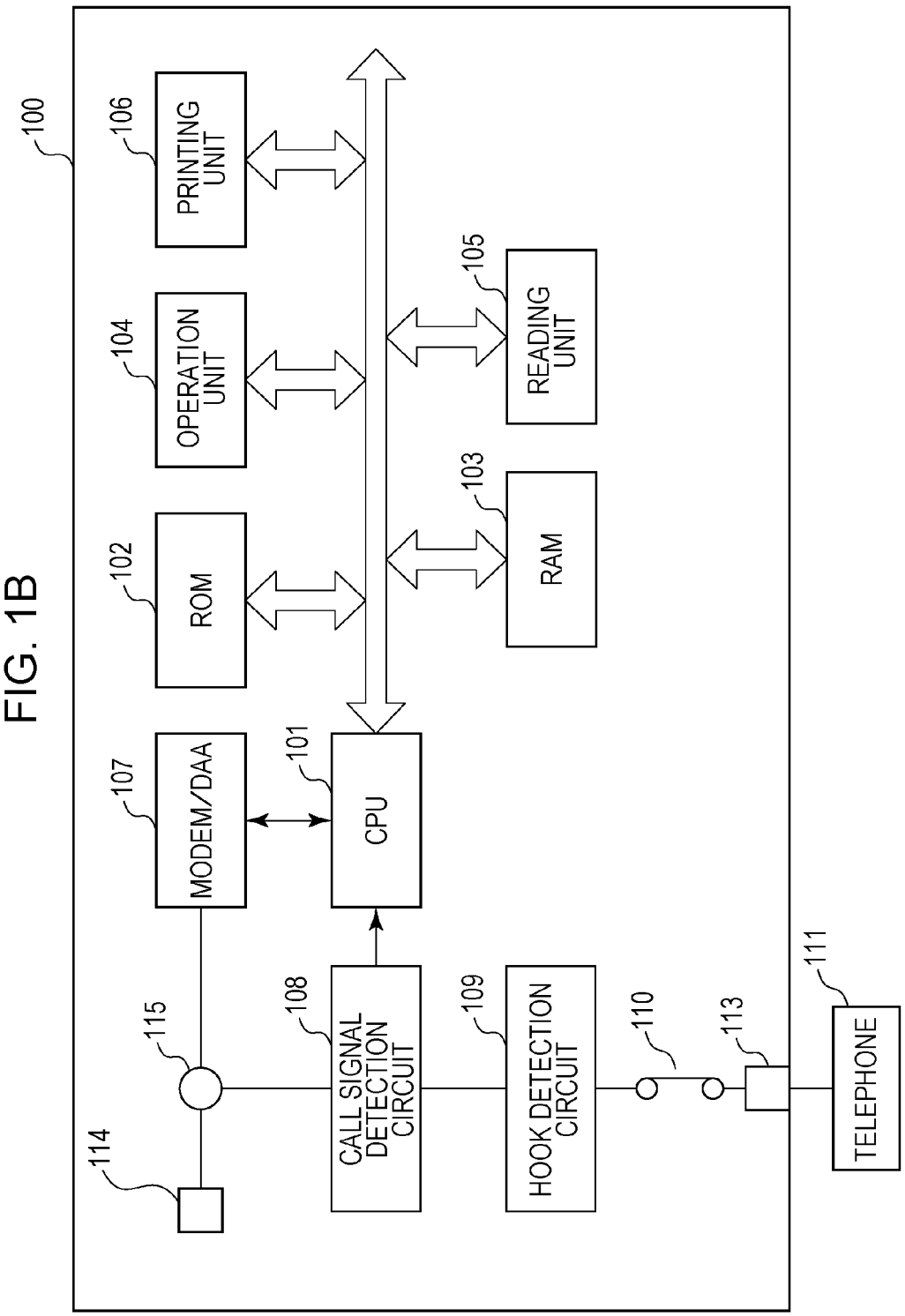

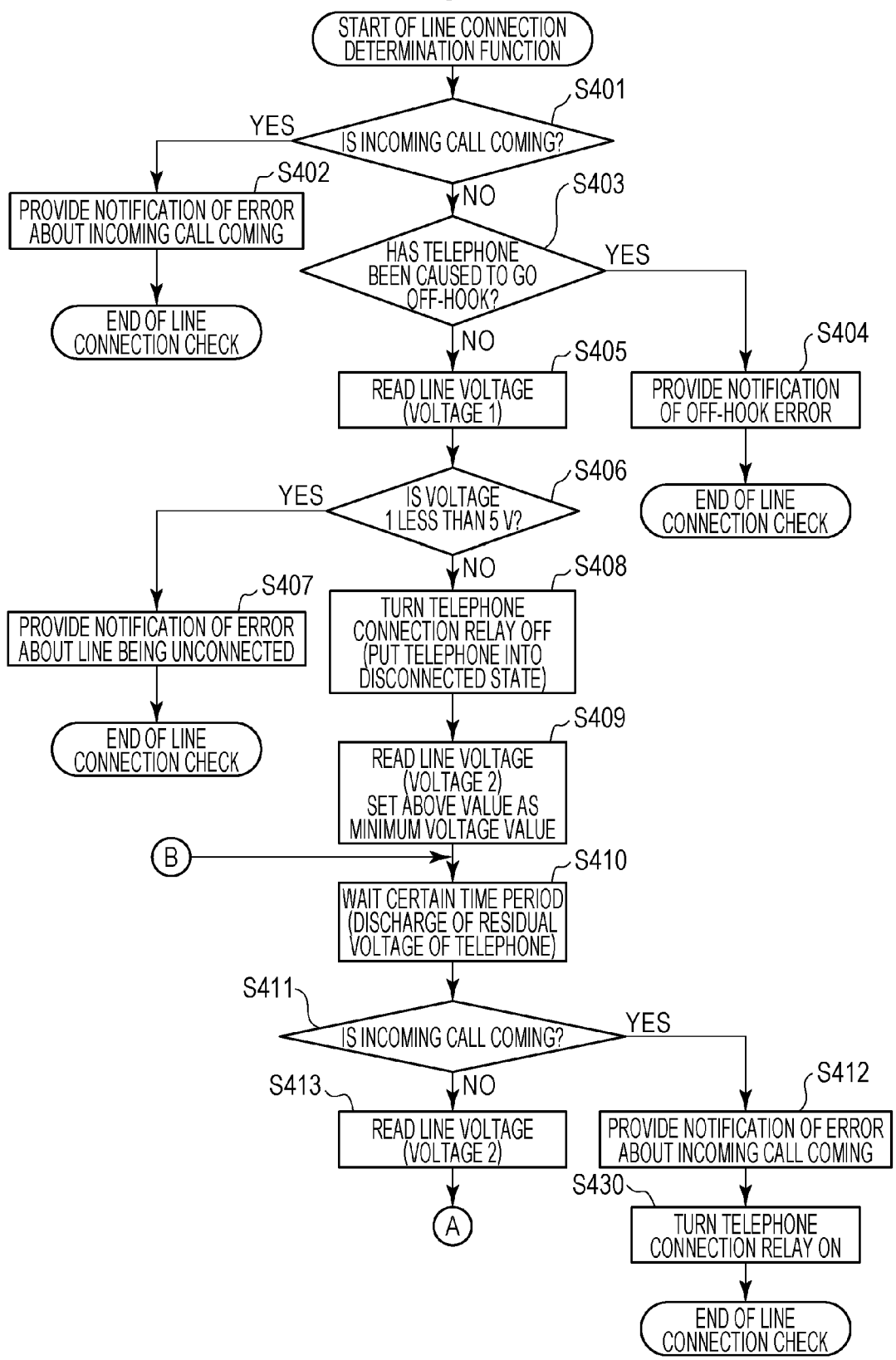

COMMUNICATION APPARATUS AND CONTROL METHOD FOR THE SAME

BACKGROUND

Field of the Disclosure

The present disclosure relates to a communication apparatus that performs communication via a telephone line, and that includes a line connection terminal to which the telephone line is connected, and a telephone connection terminal to which a telephone is connected.

Description of the Related Art

In various communication apparatuses, such as a facsimile machine and the like, that perform communication via a telephone line, a telephone for a voice call is further connected to the communication apparatuses in some cases. In such cases, the communication apparatuses each includes a line connection terminal to which the telephone line is connected, and a telephone connection terminal to which the telephone is connected. In many cases, however, there are used a line connection terminal and a telephone connection terminal that are the same in shape, the respective terminals are therefore connected to respective wrong connection destinations sometimes, and thus the communication apparatuses do not operate properly. Incidentally, there is known a communication apparatus including a connection unit (hereinafter also referred to as "telephone connection relay") that controls whether or not a telephone connection terminal is to be connected to a modem unit and a line connection terminal. Japanese Patent Publication No. 5146430 discloses the following method. A line voltage acquired under conditions where a telephone connection terminal is connected by a relay is compared with a line voltage acquired under conditions where the telephone connection terminal is not connected by the relay, and, if the line voltage acquired under conditions where the telephone connection terminal is connected is higher, it is determined that a wrong connection has been made.

Incidentally, a telephone to be connected to the telephone connection terminal typically includes an element (hereinafter referred to as "capacitance element") having a capacitance component, such as a capacitor or varistor, for various purposes. For this reason, when a telephone line is connected to the communication apparatus, the capacitance element is charged by a line voltage supplied from the telephone line to a value (for example, 48 V) close to the line voltage. In a normal standby state, the telephone is not disconnected by the telephone connection relay, and is connected to the line within the communication apparatus, and thus the capacitance element included in the telephone is charged even if the telephone is subjected to a wrong connection. Even if the telephone line is disconnected by the telephone connection relay under such conditions, electric charges accumulated in the capacitance element included in the telephone subjected to a wrong connection are not discharged quickly. For this reason, in the method described in Japanese Patent Publication No. 5146430, the voltage may not decrease depending on a charge voltage or discharge state of a capacitance element, and, although a telephone is actually wrongly connected to a line connection terminal, it may be erroneously detected that the telephone is correctly connected. In particular, in the case where an exchange is a private branch exchange, a voltage value applied is typically low, a phenomenon in which the value of a reduction in voltage decreases is therefore more conspicuous, and thus the line voltage acquired under conditions where the telephone connection terminal is connected and the line voltage acquired under conditions where the telephone connection terminal is not connected are substantially the same value.

SUMMARY

In view of the above circumstances, the present invention provides a communication apparatus accepting connection of a telephone and connecting to a telephone line. The communication apparatus includes: a line connection terminal configured to connect the communication apparatus to the telephone line; a telephone connection terminal configured to connect the communication apparatus to the telephone; a control unit configured to control the communication apparatus; a modem unit provided on a connection path between the line connection terminal and the control unit; an identification unit configured to identify a voltage of the connection path; a switching unit configured to switch between connection and disconnection of the telephone connection terminal to and from the modem unit; a first determination unit configured to determine whether a first voltage identified by the identification unit under conditions where the telephone connection terminal is connected to the modem unit is greater than or equal to a first threshold value; a second determination unit configured to, if the first determination unit determines that the first voltage is greater than or equal to the first threshold value, determine whether a second voltage identified by the identification unit under conditions where the telephone connection terminal is disconnected from the modem unit tends to decrease; and a third determination unit configured to determine connection states of the telephone connection terminal and the line connection terminal based on a determination result of the first determination unit and a determination result of the second determination unit. If the second determination unit determines that the second voltage identified by the identification unit has decreased more than once, the third determination unit determines that a wrong connection has been made.

Further features of the present invention will become apparent from the following description of exemplary embodiments with reference to the attached drawings.

BRIEF DESCRIPTION OF THE DRAWINGS

FIGS. 1A and 1B are block diagrams each illustrating the configuration of a communication apparatus according to an exemplary embodiment of the present invention.

FIGS. 4A and 4B are flowcharts illustrating a line connection determination process.

DESCRIPTION OF THE EMBODIMENTS

First Exemplary Embodiment

Figure 2A:
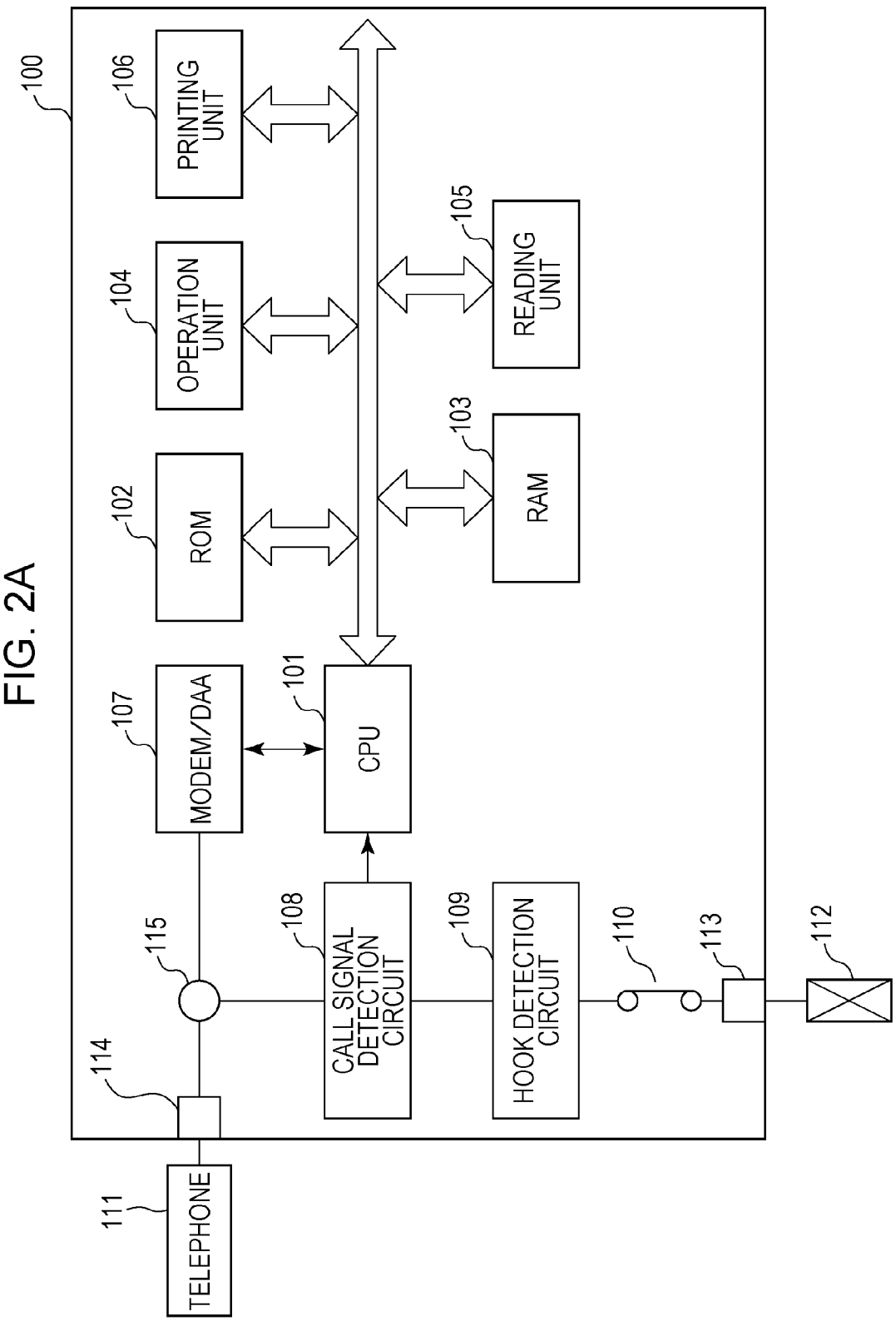
FIGS. 2A and 2B are block diagrams each illustrating the configuration of the communication apparatus according to this exemplary embodiment of the present invention.

Exemplary embodiments of the present invention will be described below with reference to the drawings. It is noted that the relative placement of components of an apparatus used in these exemplary embodiments, the shape of the apparatus, and so forth are merely examples, and are not limited to only these.

FIGS. 1A, 1B, 2A, and 2B are each a schematic view of a communication apparatus according to an exemplary embodiment of the present invention.

A communication apparatus 100 includes a central processing unit (CPU) 101, a read only memory (ROM) 102, a random access memory (RAM) 103, an operation unit 104, a reading unit 105, a printing unit 106, a modem/data access arrangement (DAA) 107, a call signal detection circuit 108, and a hook detection circuit 109. There are further included a telephone connection relay 110, a telephone connection terminal 113, and a line connection terminal 114. This communication apparatus has a facsimile function.

The CPU 101 is a control unit of the communication apparatus 100. The CPU 101 controls the entire communication apparatus by using part of the RAM 103 as a work area on the basis of a control program or the like for facsimile communication, display, recording, or the like stored in the ROM 102. The CPU 101 also calculates a voltage reduction count, a minimum voltage value, and a loop counter value.

In addition to the above-described work area, buffers, stack data, and so forth that are necessary for various operations are stored in the RAM 103. For example, the RAM 103 is used as an area in which an image read by the reading unit 105 is temporarily stored.

The operation unit 104 includes various keys to be operated by a user, such as a numeric keypad, cursor keys, a start key, and a stop key, a liquid crystal display (LCD) to display a message, a speaker to emit a key touch tone, and so forth. The user can make a telephone call to a certain person by using the numeric keypad, select from various menu items by using the cursor keys and the start key, or give an instruction to perform an operation, such as facsimile transmission. In this exemplary embodiment, an instruction to make a line connection determination is provided from the operation unit 104, and a result is displayed on the LCD.

The reading unit 105 includes a contact image sensor, a gate array to perform image processing on read data as appropriate, and so forth, and scans an original document so as to generate image data. The reading unit 105 reads an original document for copying or facsimile transmission, and stores the read data in the RAM 103. The data stored in the RAM 103 is subjected to facsimile transmission via a communication unit (the modem/DAA 107), or is transferred to and printed by the printing unit 106.

The printing unit 106 prints a copy or facsimile-received image data stored in the RAM 103. The printing unit 106 can also print various soft parameters stored in the RAM 103. The printing unit 106 may be a unit using any printing method of an inkjet method, a thermal recording method, a thermal transfer recording method, and an electrophotographic method, for example.

The communication apparatus 100 accepts connection of a telephone 111.

The modem/DAA 107 is connected to a telephone line (public line), and performs network control and image signal modulation/demodulation for facsimile transmission and reception. In this exemplary embodiment, a voltage at 115 is measured by the modem/DAA 107, and can be acquired on the basis of a command from the CPU 101. That is, the modem/DAA 107 identifies a voltage at 115 on the basis of a command from the CPU 101. The modem/DAA 107 is provided on a connection path between the line connection terminal 114 and the CPU 101.

The call signal detection circuit 108 is connected to the telephone line in parallel with the modem/DAA 107, and detects a call signal (hereinafter referred to as an incoming call) coming from the telephone line. It is noted that the term "telephone line" here may be a public switched telephone network (PSTN), or a private network in which a private branch exchange (PBX) is used as an exchange.

A point at which a line voltage is measured in this exemplary embodiment is a point indicated by 115 in FIGS. 1A, 1B, 2A, and 2B. It is noted that, although the modem/DAA 107 includes a line voltage measurement unit in this exemplary embodiment, the line voltage measurement unit may be provided outside the modem/DAA 107.

The hook detection circuit 109 detects whether the telephone 111 connected to the communication apparatus 100 has been caused to go off-hook (into an off-hook state) or on-hook (into an on-hook state).

The telephone connection relay 110 is a so-called switching unit to selectively switch between connection and disconnection of the telephone 111 to and from an apparatus circuit. In this exemplary embodiment, the telephone connection relay 110 is disposed between the telephone connection terminal 113 and the hook detection circuit 109, and selectively switches between disconnection and connection of the telephone connection terminal 113.

Disconnection of the telephone connection relay 110 from the apparatus can keep the telephone 111 from ringing, and perform control so that tones generated during facsimile reception do not come to a telephone 111 side.

The telephone 111 is connected to the communication apparatus 100 via the telephone connection terminal 113.

An exchange 112 exists on a telephone office side, and is connected to the communication apparatus 100 via the line connection terminal 114.

The telephone connection terminal 113 is a connection terminal to connect the communication apparatus 100 to the telephone 111, and the line connection terminal 114 is a connection terminal to connect the communication apparatus 100 to the telephone line of the exchange 112.

Here, FIG. 1A is a block diagram in the case where the telephone line is in a state of being connected to the line connection terminal 114, and FIG. 1B is a block diagram in the case where the telephone line is in a state of being unconnected to the line connection terminal 114.

As illustrated in FIG. 1A, in the case where the telephone line is in a state of being connected to the communication apparatus 100, the exchange 112 applies a fixed voltage (48 V in this exemplary embodiment) at all times, and a line voltage value is therefore a value close to 48 V.

As illustrated in FIG. 1B, in the case where the telephone line is in a state of being unconnected to the communication apparatus 100, the exchange 112 to apply a voltage is not connected, and a voltage value at 115 is therefore a value close to 0 V. In FIG. 1B, although the telephone 111 is connected to the communication apparatus 100, even if the telephone 111 is in an unconnected state, the line voltage value is also 0 V. Hence, if the voltage value at 115 is less than a predetermined value, it can be determined that the line is unconnected except the case where an incoming call is coming. The case of an incoming call will be described later.

FIG. 2A is a block diagram in the case where the telephone 111 and the exchange 112 are wrongly connected to the line connection terminal 114 and the telephone connection terminal 113, respectively, and where the telephone connection relay 110 is closed. In FIG. 2A, since the telephone connection relay 110 is in a closed state, a voltage value applied by the exchange 112 is directly measured as a voltage at 115, and thus the voltage value at 115 is a value close to 48 V. It is noted that, even if the telephone 111 is in an unconnected state, the line voltage value is also 48 V.

Figure 2B:
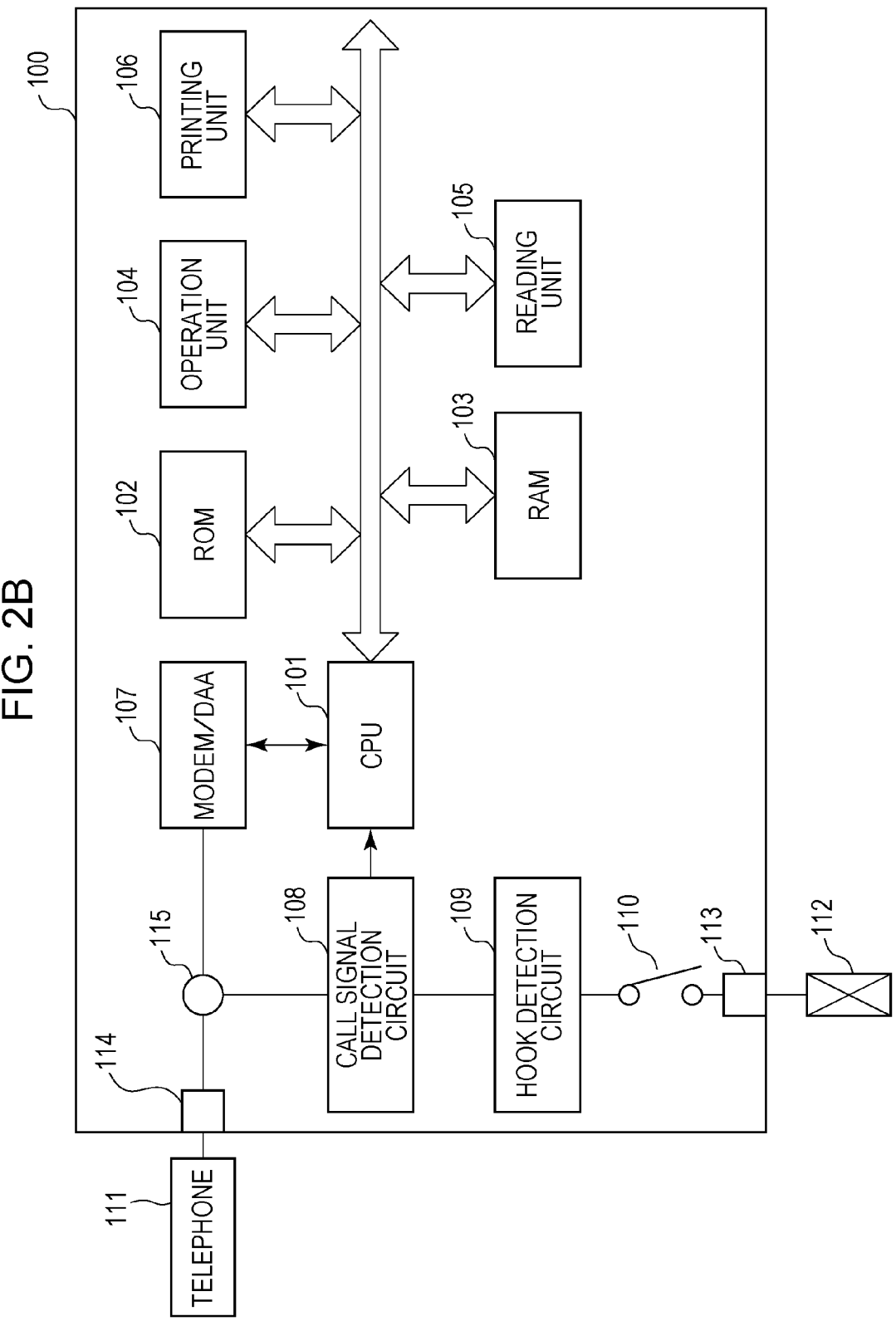

FIG. 2B is a block diagram in the case where the telephone 111 and the exchange 112 are wrongly connected to the line connection terminal 114 and the telephone connection terminal 113, respectively, and where the telephone connection relay 110 is open. In FIG. 2B, since the telephone connection terminal 113 is in a state of being disconnected by the telephone connection relay 110, the line voltage is 0 V. For this reason, if the voltage value before disconnection of the telephone connection terminal 113 by the telephone connection relay 110 is greater than or equal to a certain value, and if the voltage value after the disconnection is less than the certain value, it can be determined that a wrong connection has been made except a certain case. In the case where the telephone 111 is connected as illustrated in FIG. 2B, however, a capacitance element included in the telephone 111 is likely to have been charged at the voltage value applied before disconnection of the telephone connection terminal 113 by the telephone connection relay 110. In this case, the line voltage value is a value close to 48 V for a while after the telephone connection terminal 113 is disconnected by the telephone connection relay 110, and thus it is difficult to determine that a wrong connection has been made.

Thus, in this exemplary embodiment, it is determined whether a line connection is correct on the basis of a result of a determination as to whether a voltage tends to decrease in the case where the telephone connection relay 110 is in an OFF state (that is, the relay is open, and the telephone connection terminal 113 is disconnected to be in a state of not being connected). Specifically, first, a voltage 1 under conditions where the telephone connection relay 110 is in an ON state is acquired. If the voltage 1 is less than a predetermined value, it is determined that the line is unconnected to the communication apparatus 100. Furthermore, if the voltage 1 is greater than or equal to the predetermined value, a voltage is acquired more than once under conditions where the telephone connection relay 110 is in an OFF state, and, if it is recognized more than once that the voltage has decreased, it is determined that a wrong connection has been made.

FIGS. 3A to 3D are each a timing chart of a line connection determination in each connection state. The vertical axis represents the voltage value detected by the modem/DAA 107, and the horizontal axis represents time course.

Figure 3A:
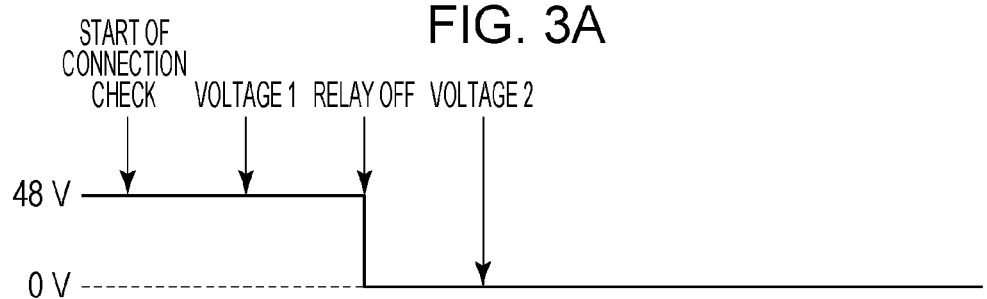
FIGS. 3A to 3D each illustrate an overview of a line connection determination of the present invention.

FIG. 3A illustrates an example of a timing chart of a line connection determination in the case where the telephone 111 is unconnected to the communication apparatus 100 in a wrong connection state. First, when an instruction to make a line connection determination is provided by the operation unit 104, under conditions where the telephone connection terminal 113 is connected by the telephone connection relay 110, the modem/DAA 107 acquires a line voltage (hereinafter, a line voltage under conditions where the telephone connection relay 110 is in an ON state is referred to as "voltage 1"). Subsequently, under conditions where the telephone connection terminal 113 is disconnected by the telephone connection relay 110 ("relay OFF" in FIG. 3A), the modem/DAA 107 acquires a voltage again (hereinafter, a line voltage after the telephone connection relay 110 is turned OFF is referred to as "second voltage"). If the second voltage is less than a predetermined value, it is determined that the line is in a wrong connection state.

Figure 3B:
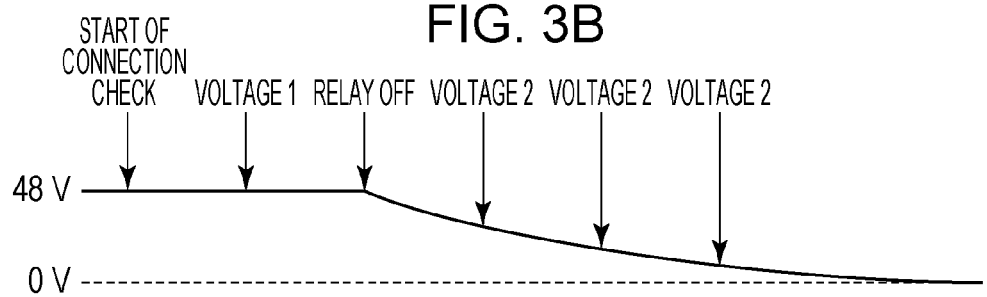

FIG. 3B illustrates an example of a timing chart of a line connection determination in the case where the telephone 111 is connected to the line connection terminal 114 in a wrong connection state as illustrated in FIGS. 2A and 2B. In this case, the second voltage under conditions where the telephone connection relay 110 is in an OFF state is substantially the same value as the voltage 1 for a while after a point in time when the telephone connection relay 110 is turned OFF. Hence, in this exemplary embodiment, the second voltage is acquired more than once as illustrated in FIG. 3B, and, if it is detected that the second voltage tends to decrease, it is determined that the line is in a wrong connection state. That is, if the second voltage decreases more than once, it is determined that the line is in a wrong connection state.

Figure 3C:
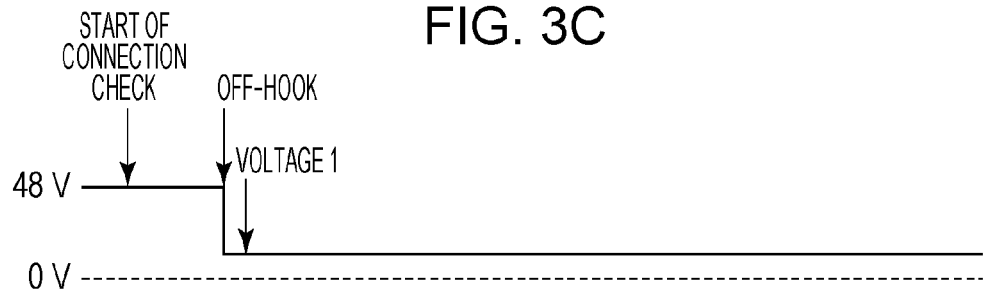

FIG. 3C illustrates an example of a timing chart of a line connection determination in the case where the telephone 111 is caused to go off-hook in a period after, in a correct connection state, an instruction to make the line connection determination is provided and before the voltage 1 is acquired. If the telephone 111 is caused to go off-hook, a loop is formed between the telephone 111 and the exchange 112, and thus a voltage drop occurs. A voltage acquired at this point in time varies according to environment, such as voltages of the telephone 111 and the exchange 112, and it takes on values close to values ranging from 5 V to 12 V, for example. For this reason, at a point in time when the telephone 111 is caused to go off-hook, the voltage 1 under conditions where the telephone connection relay 110 is in an ON state reaches a considerably smaller value than a normal value of 48 V. It is noted that, for example, after "relay OFF" indicated in FIG. 3A, since the telephone 111 is in a state of being disconnected from the apparatus, the voltage does not vary even if the telephone 111 is caused to go off-hook.

Figure 3D:
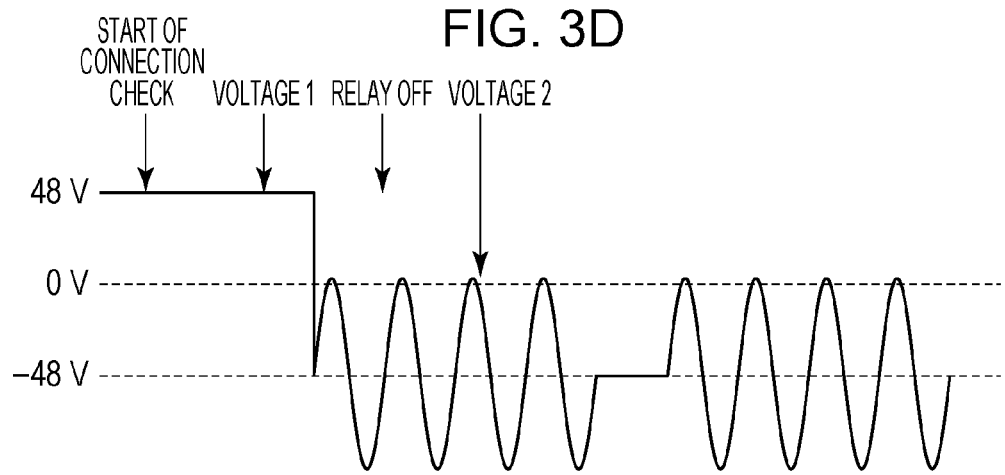
Figure 4B:
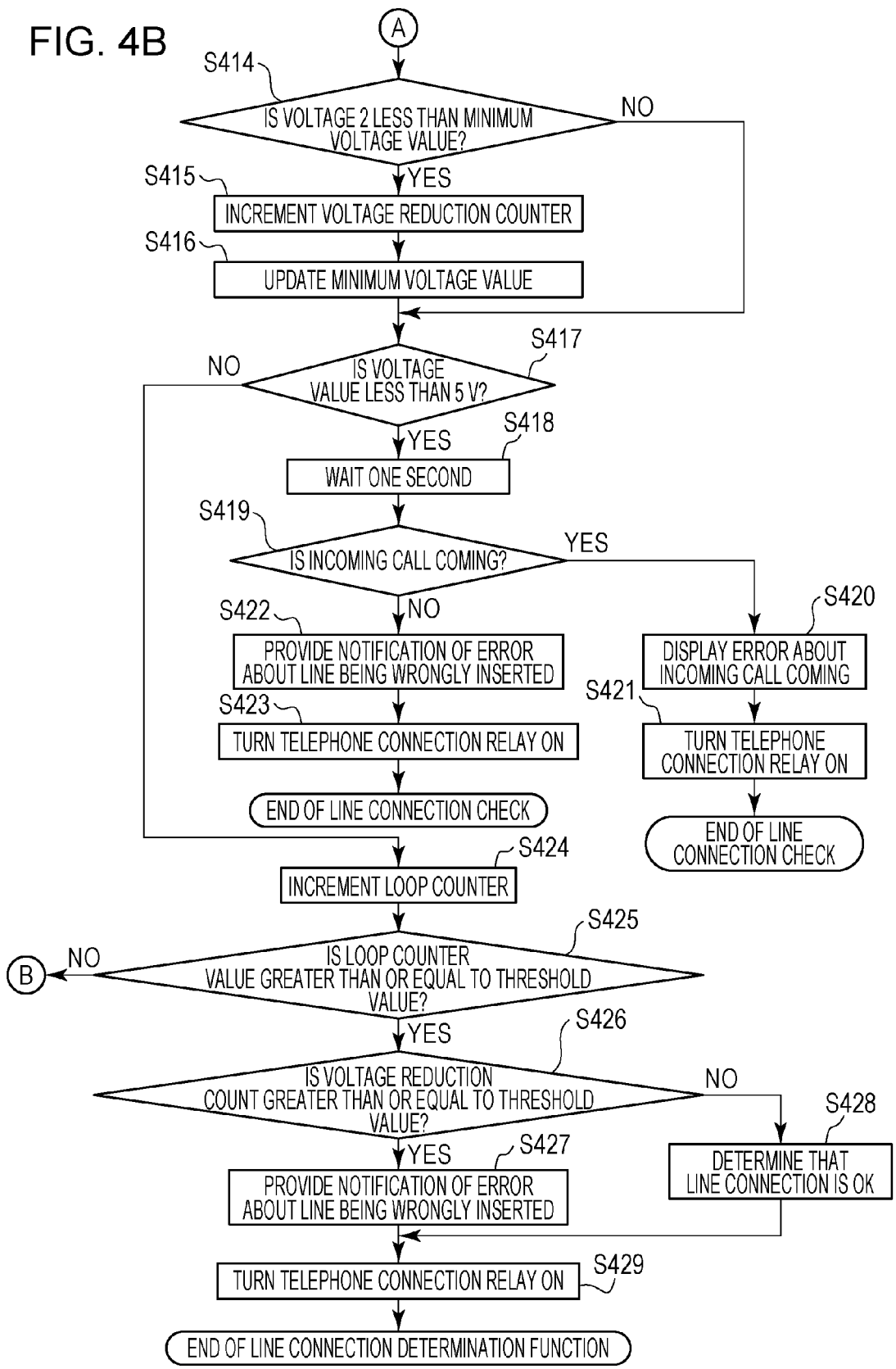

FIG. 3D illustrates an example of a timing chart of a line connection determination in the case where an incoming call comes after, in a correct connection state, an instruction to make the line connection determination is provided and then the voltage 1 under conditions where the telephone connection relay 110 is in an ON state is acquired. When an incoming call comes, a voltage varies at a fixed frequency, and its value therefore varies considerably according to a point in time when the voltage is acquired. For this reason, in this exemplary embodiment, it is determined that a correct determination cannot be made. FIGS. 4A and 4B are flowcharts illustrating a determination process flow of line connection according to this exemplary embodiment. The flowcharts in FIGS. 4A and 4B illustrate a flow of a process performed by the CPU 101 loading a control program stored in the ROM 102 into the RAM 103 and executing it.

The determination process in FIGS. 4A and 4B starts under conditions where the telephone 111 is not disconnected by the telephone connection relay 110 (a relay ON state). Furthermore, although not illustrated, the determination process starts after a voltage reduction counter, a minimum voltage value, and a loop counter value, which will be described later, are initialized.

The CPU 101 determines whether an incoming call is coming in S401.

If an incoming call is coming (Yes in S401), a notification of an error about an incoming call coming is provided (S402), and the process ends. An example of providing a notification of an error about an incoming call coming is, but not limited to, display of a message, "make a determination again because an incoming call is coming" or the like, and a message may be provided in the form of voice. The reason why an error is given during an incoming call is because a voltage value varies during an incoming call as illustrated in FIG. 3D, and a correct determination cannot be made even if the voltage 1 is acquired.

If it is determined that an incoming call is not coming in S401 (No in S401), the hook detection circuit 109 determines whether the telephone 111 has been caused to go off-hook (S403).

If the telephone 111 has been caused to go off-hook (Yes in S403), a notification of an off-hook error is provided (S404), and the process ends. An example of providing a notification of an off-hook error is, but not limited to, display of a message, "put down the telephone" or the like, and a message may be provided in the form of voice.

If the telephone 111 has not been caused to go off-hook in S403 (No in S403), it can be considered that a line voltage has not varied due to external factors, and thus the modem/DAA 107 acquires the line voltage (S405). The line voltage acquired here is a line voltage 1.

In S406, it is determined whether the line voltage 1 is less than a predetermined threshold value (less than 5 V in this exemplary embodiment). It is noted that the predetermined threshold value can be set as appropriate, and may be a fixed value regardless of a voltage value applied by the telephone line, or may be set to a different value in accordance with a voltage applied by the telephone line. In this exemplary embodiment, the predetermined threshold value is a fixed value (5 V). It is noted that, since a voltage value applied by the telephone line differs between countries, a different value may be set in each country where the communication apparatus 100 is installed.

If the line voltage 1 is less than the predetermined threshold value (5 V) (Yes in S406), it is determined that the telephone line is not connected to either the telephone connection terminal 113 or the line connection terminal 114, a notification of an error about the line being unconnected is provided (S407), and the process ends. An example of providing a notification of an error about the line being unconnected is, but not limited to, display of a message, "the line is unconnected" or the like, and a message may be provided in the form of voice.

If the line voltage 1 is greater than or equal to the predetermined threshold value (5 V) (No in S406), the telephone connection terminal 113 is disconnected by the telephone connection relay 110 (S408), the modem/DAA 107 acquires a line voltage again, and this is set as a minimum voltage value (S409). The line voltage acquired here is a second voltage. Subsequently, in S410, the CPU 101 waits a certain time period (waits 500 ms in this exemplary embodiment) so that the voltage of the telephone 111 having been connected is discharged. Then, in S411, it is determined whether an incoming call is coming by using the call signal detection circuit 108 (S411).

If it is determined that an incoming call is coming (Yes in S411), a notification of an error about an incoming call coming is provided (S412), the telephone connection relay 110 is put back into a relay ON state (S430), and then the process ends. It is noted that a notification of an error about an incoming call coming is provided in the same way as in S402.

If it is determined that an incoming call is not coming (No in S411), a second voltage is acquired (S413), and it is determined whether the second voltage is less than the minimum voltage value (S414). If the voltage acquired in S413 is less than the minimum voltage value (Yes in S414), the voltage reduction counter is incremented, and the minimum voltage value is updated to the voltage value acquired in S413 (S415, S416). If the voltage value acquired in S413 is not less than the minimum voltage value (No in S414), the process simply proceeds to S417. In this way, it is determined whether the voltage tends to decrease.

In S417, it is determined whether the voltage value is less than a predetermined threshold value (less than 5 V in this exemplary embodiment), and, if the voltage value is less than the predetermined threshold value, in S418, the CPU 101 waits a predetermined time period (waits one second in this exemplary embodiment) before determining whether an incoming call is coming, and determines whether an incoming call is coming (S419). If the voltage value is greater than or equal to the predetermined threshold value, the process proceeds to S424.

If the voltage value is less than the predetermined threshold value, it can be basically determined that the line is in a wrong connection state, and that the telephone 111 is unconnected as illustrated in FIG. 3A, or has hardly been charged even if the telephone 111 is connected. However, there is a possibility that an incoming call is coming as illustrated in FIG. 3D. For this reason, in S418, the CPU 101 waits a time period before determining whether an incoming call is coming, and determines whether an incoming call is coming in S419.

If an incoming call is coming (Yes in S419), an error about an incoming call coming is displayed (S420), the telephone connection relay 110 is put back into an ON state (S421), and the process ends. If an incoming call is not coming (No in S419), the user is notified of an error about the line being wrongly inserted (S422) because a wrong line connection has been made, the telephone connection relay 110 is put back into an ON state (S423), and the process ends.

If the voltage value is not less than the predetermined threshold value (No in S417), a loop counter is incremented (S424), and it is determined whether a count is greater than or equal to a threshold value (S425). A threshold value of the loop counter is, for example, six (times). If a count is less than the threshold value (No in S425), the process returns to S410, and the operations of S410 to S424 are repeated until a count reaches or exceeds the threshold value. In S425, if a count is greater than or equal to the threshold value, that is, if a count is greater than or equal to six (Yes in S425), it is determined whether a voltage reduction count obtained by adding increments within respective loops is greater than or equal to a threshold value (four times in this exemplary embodiment) in S426. That is, it is determined whether a voltage reduction has been recognized four or more times.

If a voltage reduction count is greater than or equal to four (Yes in S426), it is determined that the telephone 111 is in a wrong connection state in which it is connected to the line connection terminal 114 as illustrated in FIG. 3B, a notification of an error about the line being wrongly inserted is provided (S427), the telephone connection relay 110 is put back into an ON state (S429), and the process ends.

If a voltage reduction count is less than four (No in S426), it is determined that the voltage is stable and is in a certain range, and thus it is determined that a line connection is correct (line connection determination OK) (S428). The telephone connection relay 110 is put back into an ON state (S429), and the process ends.

In this exemplary embodiment, in the case where the telephone connection relay 110 is in an ON state, that is, in the case where the telephone connection terminal 113 is in a connected state, it is determined whether a line voltage (voltage 1) is greater than or equal to a predetermined threshold value. In the case where the line is connected, even if the line is connected to the telephone connection terminal 113, the line voltage at 115 is a voltage value applied by the exchange 112. For this reason, if the line voltage is less than the predetermined value, it is determined that the line is not connected to either of the terminals.

Furthermore, in this exemplary embodiment, in the case where the telephone connection terminal 113 is in a connected state, and where the line voltage (voltage 1) is greater than or equal to the predetermined threshold value, the tendency of a voltage under conditions where the telephone connection relay 110 is in an OFF state is determined. In the case where nothing is connected to the line connection terminal 114, or in the case where the telephone 111 whose residual voltage is likely to be discharged is connected to the line connection terminal 114, the voltage reaches a value (value close to 0 V) less than a predetermined value quickly. On the other hand, in the case where the telephone 111 whose inner part has been charged is connected to the line connection terminal 114, the voltage value does not decrease quickly, and, for a while, is a voltage value similar to that in the case where the line is connected. Thus, if the line voltage (second voltage) acquired under conditions where the telephone connection relay 110 is in an OFF state is less than the predetermined value, or if it is determined that the voltage has decreased a certain number of times after the line voltage (second voltage) acquired under conditions where the telephone connection relay 110 is in an OFF state is measured at certain intervals more than once, it is determined that a wrong connection has been made. Hence, wrong connections to the telephone connection terminal 113 and the line connection terminal 114 can be determined with high accuracy.

As described above, in this exemplary embodiment, even if there is an interval in which a minimum voltage value cannot be updated to a line voltage (second voltage) under conditions where the telephone connection relay 110 is in an OFF state because of noise caused by an incoming call or the like, or characteristics of the telephone 111, it can be determined that a wrong connection has been made. Specifically, in this exemplary embodiment, if a reduction in minimum voltage value is recognized four times in an interval of a total of three seconds obtained by multiplying 500 ms by 6 times, it is determined that a wrong connection has been made.

Furthermore, in this exemplary embodiment, under conditions where the telephone connection relay 110 is in an ON state, if an incoming call is coming, or if the telephone 111 is caused to go off-hook, an error notification is provided, thereby making it possible to prevent an erroneous determination of line connection caused by variations in voltage due to an incoming call coming or off-hook operation.

According to this exemplary embodiment, erroneous detection of a line connection state can be suppressed, and a connection state of a telephone line can be detected with increased accuracy. For example, even if a capacitance element included in a telephone has been charged, a wrong connection can be detected with accuracy.

Furthermore, in the case where a correct connection has been made, when a call (hereinafter referred to as "incoming call") from an exchange is coming, a line voltage value varies at a fixed frequency (for example, 16 Hz). In addition, in the case where a correct connection has been made, when the telephone is caused to go off-hook, a loop is formed between the telephone and the exchange, and thus a voltage drop occurs. For this reason, according to a known method, even if a correct connection has been made, when a determination is made in the case where an incoming call is coming, or where the telephone is caused to go off-hook, it may be erroneously detected that a wrong connection has been made on the basis of a reduction in voltage. On the other hand, in this exemplary embodiment, erroneous detection of a connection state of the telephone line in the case where an incoming call is coming, or where the telephone is caused to go off-hook, can be suppressed.

Other Exemplary Embodiments

The present invention is not limited to the above-described exemplary embodiment. For example, in the above-described exemplary embodiment, a line voltage is acquired more than once under conditions where the telephone connection relay 110 is in an OFF state, a minimum voltage is updated if the voltage is lower than the minimum voltage, and it is determined that a wrong connection has been made if it is recognized more than once that the line voltage has decreased from the minimum voltage. However, the present invention is not limited to this. For example, a rate of change in voltage over a certain time period may be checked, and it may be determined that a voltage has decreased more than once if the rate of change in voltage decrease.

Furthermore, although, in the above-described exemplary embodiment, it is determined whether the second voltage is less than the predetermined threshold value, it may be determined whether the voltage does not exceed a minimum voltage in S414 without determining whether the second voltage is less than the predetermined threshold value. That is, if no change occurs more than once (if a change occurs zero times), it may be determined that a wrong connection has been made.

Furthermore, although, in the above-described exemplary embodiment, it is determined that a wrong connection has been made if a reduction in the second voltage is recognized four times, the number of times is not limited to this, and can be set as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-262502, filed Dec. 25, 2014, which is hereby incorporated by reference herein in its entirety.

What is claimed is:

1. A communication apparatus accepting connection of a telephone and connecting to a telephone line, the communication apparatus comprising:
   a memory storing a program;
   at least one processor which executes the program stored in the memory;
   a line connection terminal configured to connect the communication apparatus to the telephone line;
   a telephone connection terminal configured to connect the communication apparatus to the telephone;
   a modem provided on a connection path between the line connection terminal and the at least one processor;
   a connection relay configured to switch between connection and disconnection of the telephone connection terminal to and from the modem
   wherein the at least one processor executes first determination for determining whether a first voltage of the connection path under conditions where the telephone connection terminal is connected to the modem is greater than or equal to a first threshold value
   if the at least one processor determines by the first determination that the first voltage is greater than or equal to the first threshold value, the at least one processor executes second determination for determining whether a second voltage of the connection path under conditions where the telephone connection terminal is disconnected from the modem tends to decrease; and
   the at least one processor executes third determination for determining connection states of the telephone connection terminal and the line connection terminal based on a determination result of the first determination and a determination result of the second determination,
   wherein, if the at least one processor determines by the second determination that the second voltage has decreased more than once, it is determined by the third determination that a wrong connection has been made.

2. The communication apparatus according to claim 1, wherein, if the second voltage is less than a second threshold value, the at least one processor determines by the third determination that a wrong connection has been made.

3. The communication apparatus according to claim 1, wherein the at least one processor determines by the second determination, based on a determination as to whether the second voltage has decreased from a second voltage which is previously identified, whether the second voltage tends to decrease.

4. The communication apparatus according to claim 1, wherein, if the at least one processor determines by the first determination that the first voltage is less than the first threshold value, the at least one processor determines by the third determination that the telephone line is unconnected.

5. The communication apparatus according to claim 1, wherein the at least one processor provides a notification of an error about connection states of the telephone connection terminal and the line connection terminal.

6. The communication apparatus according to claim 5, wherein the at least one processor detects a call signal, and if the at least one processor detects a call signal, the at least one processor provides a notification of an error.

7. The communication apparatus according to claim 5, wherein the at least one processor detects an off-hook state,
   wherein, if the at least one processor detects an off-hook state, the at least one processor provides a notification of an error.

8. The communication apparatus according to claim 1, wherein the first voltage and the second voltage are identified by the modem.

9. A control method executed by at least one processor of a communication apparatus which accepts connection of a telephone, and which includes a line connection terminal configured to connect the communication apparatus to a telephone line, a telephone connection terminal configured to connect the communication apparatus to the telephone, a modem provided on a connection path between the line connection terminal and the at least one processor, and a connection relay configured to switch between connection and disconnection of the telephone connection terminal to and from the modem, the control method comprising:
   determining whether a first voltage of the connection path under conditions where the telephone connection terminal is connected to the modem is greater than or equal to a first threshold value;
   determining, if it is determined that the first voltage is greater than or equal to the first threshold value, whether a second voltage of the connection path under conditions where the telephone connection terminal is disconnected from the modem tends to decrease; and
   determining connection states of the telephone connection terminal and the line connection terminal based on determination results,
   wherein, if it is determined that the identified second voltage has decreased more than once, it is determined that a wrong connection has been made.

10. The control method according to claim 9, wherein, if the second voltage is less than a second threshold value, it is determined that a wrong connection has been made.

11. The control method according to claim 9, wherein it is determined, based on a determination as to whether the second voltage has decreased from a second voltage which is previously identified, whether the second voltage tends to decrease.

12. The control method according to claim 9, wherein, if it is determined that the first voltage is less than the first threshold value, it is determined that the telephone line is unconnected.

13. The control method according to claim 9, further comprising providing a notification of an error about connection states of the telephone connection terminal and the line connection terminal.

14. The control method according to claim 13, further comprising
   detecting a call signal,
   wherein, if a call signal is detected, a notification of an error is provided.

15. The control method according to claim 13, further comprising
   detecting an off-hook state,
   wherein, if an off-hook state is detected, a notification of an error is provided.

16. The control method according to claim 9, wherein the first voltage and the second voltage are identified by the modem.

* * * * *